Oct. 3, 1950        W. E. DICK        2,524,122
DUMP WAGON
Filed Dec. 17, 1945
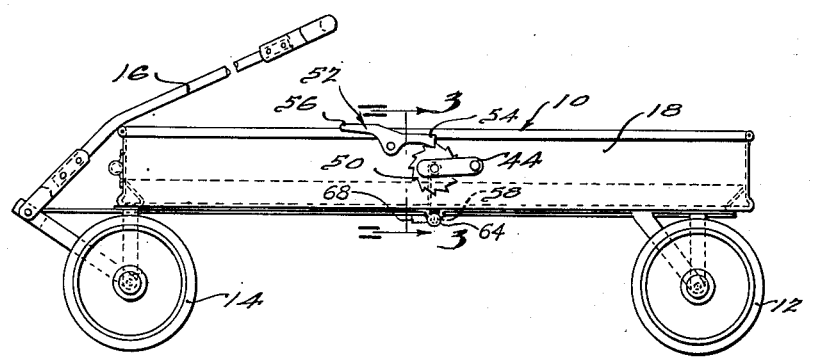
FIG. 1.
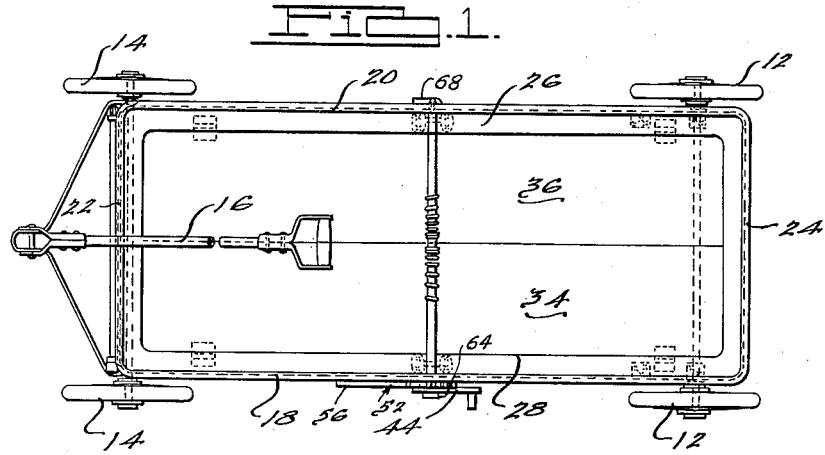
FIG. 2.
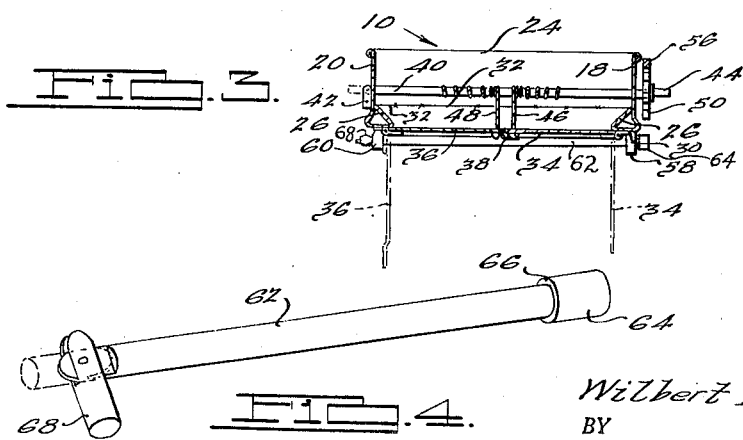
FIG. 3.
FIG. 4.
INVENTOR.
Wilbert E. Dick.
BY
Harness, Dickey & Pierce
ATTORNEYS.

Patented Oct. 3, 1950

2,524,122

UNITED STATES PATENT OFFICE 2,524,122

DUMP WAGON

Wilbert E. Dick, Detroit, Mich.

Application December 17, 1945, Serial No. 635,480

3 Claims. (Cl. 298—35)

The invention relates broadly to dump wagons and more particularly to a child's dump wagon having novel mechanism for operating the dump panels or doors and for holding such panels normally closed.

An important object of the invention is to provide a dump wagon in which the load can be readily dumped through the bottom of the wagon bed.

Another object of the invention is to provide a dump wagon in which the dumping mechanism is simple in construction but highly efficient in operation.

Yet another object of the invention is to provide a dump wagon in which the dumping mechanism can be easily operated by a small child.

Still another object of the invention is to provide a dump wagon that is rigid and strong in construction but inexpensive to manufacture.

Other objects and advantages of the invention will be apparent during the course of the following description.

In the drawing forming a part of this specification, wherein like numerals are employed to designate like parts throughout the same, Fig. 1 is a side elevation of a dump wagon embodying the invention, Fig. 2 is a top plan view thereof, Fig. 3 is a vertical sectional view taken on the line 3—3 of Fig. 1, and Fig. 4 is a perspective view of a locking bar adapted for use in holding the dump panels closed.

Reference is now had to the drawing which shows a child's dump wagon having a substantially rectangular bed 10 which preferably is formed of sheet metal. At its rearward end the bed 10 is mounted on a pair of ground-engaging wheels 12, and at its forward end the bed is mounted on a pair of ground-engaging wheels 14. The latter pair of wheels preferably is provided with a conventional swivel mounting so that the wheels can be turned to guide the wagon and is equipped with the usual handle 16.

The bed 10 is formed with the side walls 18 and 20, end walls 22 and 24, and a bottom 26 which has a relatively large central opening 28. As best shown in Figs. 1 and 3, bottom 26 inclines angularly, upwardly and outwardly from the opening 28 and preferably is formed integrally with inward extensions 30 on the side and end walls 18—24. At its upper edge the bottom 26 is seam-welded to the inner surfaces of the side and end walls, as at 32. This construction provides a tubular bead at the bottom of the wagon bed which greatly strengthens it. In addition, the seam weld causes the inclined bottom 26 to merge smoothly with the side and end walls 18—24 so that it directs or funnels the load into opening 28. Thus, if the wagon is used to carry loose material such as dirt or ashes, the load can be completely emptied from the bed 10. By reason of the inclined nature of bottom 26, residual amounts of the load will not remain thereon around opening 28 when the load is dumped.

Opening 28 is adapted to be closed by a pair of panels 34 and 36 which are hingedly attached to the bottom 26 adjacent the side edges of opening 28. When these panels are swung upwardly, they meet at substantially the middle of opening 28 and close the same. As shown in Fig. 3, the swinging edge of panel 36 is provided with an offset portion 38 which overlaps the adjacent edge of panel 34 and closes the joint therebetween. When closed, panels 34 and 36 occupy the full-line position shown in Fig. 3 and when fully open they occupy the positions shown by the dotted lines.

Panels 34 and 36 are opened and closed by a manually operable mechanism which includes a horizontal shaft 40. This shaft extends across the bed 10 above panels 34 and 36 and is loosely journaled adjacent its ends in suitable bearings provided in the side walls 18 and 20. Both ends of the shaft project beyond the side walls, as shown in Fig. 3. One of the projecting ends carries a pivoted extension 42, and the other projecting end carries a crank arm 44. When extension 42 is in the dotted-line position shown in Fig. 3, shaft 40 can be easily removed from the bed 10; but it will be readily apparent that when the extension occupies the full-line position, it holds the shaft securely in place. Flexible tie members 46 and 48 are attached at one end to the shaft 40 between the side walls 18 and 20 and at the opposite ends thereof to panels 34 and 36 respectively adjacent their swinging edges. Thus, when the shaft 40 is rotated in one direction, the flexible tie members are wound therearound to close panels 34 and 36. On the other hand, when the shaft 40 is rotated in the opposite direction, flexible tie members 46 and 48 are unwound and permit panels 34 and 36 to open. Preferably the upper ends of the tie members 46 and 48 are attached to shaft 40 in substantially spaced relation, so that the convolutions are distributed along the shaft when the panels are closed. With respect to the winding of members 46 and 48 on shaft 40, the latter may have oppositely spiral grooves for receiving such members respectively and guiding the winding thereof on the shaft so that the members will wind in the manner shown in Figs. 2 and 3.

The end of shaft 40 to which crank arm 44 is attached also carries a ratchet 50 which coacts with a pawl 52. The latter is pivoted on the bed 10 and normally prevents rotation of shaft 40 in a direction to open panels 34 and 36. The ratchet engaging end 54 of pawl 52 is relatively heavier than the manually operated end 56, so that it is normally engaged with the ratchet. However, it will be readily apparent that the end 56 can be manually depressed to release pawl 52 from the ratchet 50 so that shaft 40 can be rotated to open panels 34 and 36.

In order to hold panels 34 and 36 normally closed and prevent inadvertent spilling of the load, a pair of retaining members, or brackets, 58 and 60 are mounted under the bed 10 at opposite sides of opening 28. These brackets are provided with aligned holes through which a locking bar 62 can be inserted. The locking bar 62 extends entirely across the bed 10, and, when carried by brackets 58 and 60, it presses against the offset portion 38 to hold the panels tightly closed. At one end thereof locking bar 62 is provided with an enlarged head 64 which has a radially extending annular shoulder 66. When the locking bar is inserted through brackets 58 and 60, shoulder 66 engages the adjacent bracket and limits axial movement of the bar. At its opposite end the bar 62 is provided with a pivoted extension 68. When aligned with the bar, as shown by dotted lines in Fig. 4, the extension 68 permits insertion or removal of the latter, and, when positioned transverse to the axis of the bar as shown by the full lines in Fig. 4, extension 68 locks the bar on the wagon. Preferably the extension 68 is pivoted a substantial distance from its end so that it projects from both sides of the bar when in the locking position and extends entirely across the hole in the adjacent bracket.

In operation, the panels 34 and 36 are closed by rotating the crank arm 44 to wind the members 46 and 48 around the shaft 40. During this operation the weighted end 54 of pawl 52 passes freely over the teeth of ratchet 50. However, when panels 34 and 36 are closed and tie members 46 and 48 are pulled taut, the pawl 52 engages one of the ratchet teeth and holds the panels tightly closed.

Bar 62 is then inserted through brackets 58 and 60 to securely lock the panels 34 and 36 in the closed position. If desired, tie members 46 and 48 can then be disengaged from the panels and the shaft 40 removed from bed 10.

When it is desired to dump a load from the wagon bed 10, locking bar 62 is removed. If shaft 40 is still assembled on the bed, pawl 52 is disengaged from ratchet 50 and the crank arm 44 is rotated in a direction to unwind the tie members 46 and 48. This operation permits the panels 34 and 36 to open and causes the load to fall through the opening 28.

It is to be understood that the form of the invention herewith shown and described is to be taken as a preferred example of the same and that various changes in the size and arrangement of parts may be resorted to without departing from the spirit of the invention or the scope of the appended claims.

Having thus described the invention, I claim:

1. A dump wagon comprising a wagon bed having a bottom provided with an opening; articulated panels attached to the bed adapted to close said opening; a manually operable rotatable shaft carried by the bed above said panels; flexible tie members connecting the shaft to the panels; retaining members mounted under the bed and at opposite sides of said opening; and a locking bar adapted to extend across said bed and to be engaged by said retaining members, when so engaged said locking bar holding the panels closed.

2. A dump wagon comprising a wagon bed having a bottom provided with an opening; articulated panels attached to the bed adapted to close said opening; a manually operable rotatable shaft carried by the bed above said panels; flexible tie members connected to the shaft and to the panels adjacent the swinging edges thereof; retaining members mounted under the bed at opposite sides of said opening and having aligning holes disposed below the panels when the latter are closed; and a locking bar adapted to extend through said holes and under said panels whereby to hold the latter closed.

3. A dump wagon comprising a wagon bed having a bottom provided with an opening; articulated panels attached to the bed adapted to close said opening; a manually operable rotatable shaft carried by the bed above said panels; flexible tie members connected to the shaft and to the panels adjacent the swinging edges thereof; retaining members mounted under the bed at opposite sides of said opening and having aligning holes disposed below the panels when the latter are closed; a locking bar adapted to extend through said holes and under said panels whereby to hold the latter closed; an enlarged head on one end of said locking bar, said head provided with a radial shoulder adapted to engage one of the retaining members and to limit axial movement of the bar in one direction; and a pivoted link on the other end of said locking bar adapted in one position to form a longitudinal extension on the bar and in another position to extend transversely to the axis of said bar and across the hole in the adjacent retaining member.

WILBERT E. DICK.

REFERENCES CITED

The following references are of record in the file of this patent:

UNITED STATES PATENTS

| Number | Name | Date |
| --- | --- | --- |
| 456,868 | Warner et al. | July 28, 1891 |
| 754,228 | Moyer | Mar. 8, 1904 |
| 1,002,174 | O'Brien | Apr. 29, 1911 |
| 1,724,489 | Luck | Aug. 13, 1929 |
| 1,733,905 | Randolph | Oct. 29, 1929 |
| 2,230,988 | Alexander | Feb. 11, 1941 |
| 2,401,407 | Benbow et al. | June 4, 1946 |